(12) United States Patent
Zhong

(10) Patent No.: US 8,790,554 B2
(45) Date of Patent: Jul. 29, 2014

(54) METHOD FOR PREPARING META-ARAMID FIBERS

(76) Inventor: Zhou Zhong, Shanghai (CN)

(*) Notice: Subject to any disclaimer, the term of this patent is extended or adjusted under 35 U.S.C. 154(b) by 144 days.

(21) Appl. No.: 13/225,530

(22) Filed: Sep. 5, 2011

(65) Prior Publication Data

US 2012/0168983 A1     Jul. 5, 2012

(30) Foreign Application Priority Data

Dec. 29, 2010    (CN) .......................... 2010 1 0619114

(51) Int. Cl.
| | |
|---|---|
| *D01D 5/06* | (2006.01) |
| *D01D 10/06* | (2006.01) |
| *D01F 6/78* | (2006.01) |
| *D01F 6/80* | (2006.01) |

(52) U.S. Cl.
CPC ..................................... *D01F 6/805* (2013.01)
USPC ..... 264/28; 264/184; 264/210.8; 264/211.14; 264/211.15; 264/211.22; 264/211.23; 264/233; 264/234

(58) Field of Classification Search
USPC .............. 264/28, 184, 210.8, 211.14, 211.15, 264/211.17, 233, 234, 211.22, 211.23
See application file for complete search history.

(56) References Cited

U.S. PATENT DOCUMENTS

| | | | | |
|---|---|---|---|---|
| 4,595,708 A | * | 6/1986 | Sundet | ............................ 521/63 |
| 4,879,130 A | * | 11/1989 | Heyland et al. | ............... 426/533 |
| 5,656,718 A | * | 8/1997 | Wautier et al. | ................ 528/357 |
| 6,569,987 B1 | * | 5/2003 | Ohba et al. | ................ 264/184 X |
| 2010/0029159 A1 | * | 2/2010 | Ishihara et al. | ............... 442/301 |

FOREIGN PATENT DOCUMENTS

| | | | |
|---|---|---|---|
| CN | 101285214 A | * | 10/2008 |
| WO | WO-2008075751 A1 | * | 6/2008 |

* cited by examiner

*Primary Examiner* — Leo B Tentoni
(74) *Attorney, Agent, or Firm* — McNeely, Hare & War LLP; Kevin J. McNeely

(57) ABSTRACT

A method of preparing meta-aramid fibers includes the operations of polymerization, neutralization and spinning using m-phenylenediamine and isophthaloyl chloride as raw materials, wherein the neutralizing agent is added in an amount that is sufficient only for neutralizing a part of hydrogen chloride, so that the resultant spin dope of polyisophthaloyl metaphenylene diamine contains salts produced by the neutralization reaction and a part of unneutralized hydrogen chloride. The method of the invention has a short production line with reduced amount of the neutralizing agent, therefore both the costs of raw materials and the production energy consumption are saved. The fibers prepared according to the method of the invention have reduced gray scale to improve the electrical insulation properties of the fibers.

9 Claims, No Drawings

METHOD FOR PREPARING META-ARAMID FIBERS

CROSS-REFERENCE TO RELATED APPLICATIONS

This utility patent application claims priority to Chinese patent application no. 201010619114.6 filed on Dec. 29, 2010, which is incorporated by reference herein.

FIELD OF THE INVENTION

This invention relates generally to the technical field of production of synthetic fibers. More particularly, the invention relates to a method for preparing meta-aramid fibers, which has advantages of short production line, increased production efficiency and reduced production costs.

BACKGROUND OF THE INVENTION

Aromatic polyamide fibers, known as aramid fibers, are synthetic fibers obtained by polycondensation and spinning of aromatic compounds as raw materials. Aramid fibers typically include polyterephthaloyl p-phenylene diamine fibers and polyisophthaloyl metaphenylene diamine fibers. The polyisophthaloyl metaphenylene diamine fibers exhibit excellent and persistent thermal stability, remarkable flame retardance and outstanding electrical insulation properties, since they have a conjugated structure formed by a meta-benzene ring and an amide bond on the main chain of the molecule, and have hydrogen bond interaction between the molecules. Therefore, the polyisophthaloyl metaphenylene diamine fibers find a wide range of applications in specialized protective clothing, high temperature filtration materials and honeycomb flame retardant materials.

Presently, one approach for preparing the polyisophthaloyl metaphenylene diamine fibers is an interfacial polymerization process which results in a powdered polymer, the powered polymer is dissolved with a cosolvent in an amide solvent, and then spun. For example, this approach is reported in U.S. Pat. No. 3,640,970. However, this approach is operating intermittently and hard to obtain a stable solution.

Another approach for preparing the polyisophthaloyl metaphenylene diamine fibers is a low temperature solution polymerization process, in which polyisophthaloyl metaphenylene diamine is prepared by a polymerization reaction in an amide solvent at a low temperature, with a side product of hydrogen chloride which is neutralized in the solution to produce salts, the polymer solution containing the salts are directly used for dry-spinning. This approach can be found in U.S. Pat. No. 3,063,966. Due to the production of high contents of salts, wet spinning would lead to fibers with low mechanical properties, and therefore is not applicable to this approach.

Moreover, attempts have been made to utilize different types of neutralizing agents to neutralize the polymerization side product, hydrogen chloride, for example in Chinese patent application No. CN1341169A. This application teaches a neutralizing agent that can be reacted with hydrogen chloride to give a solvent-insoluble salt which can be removed by filtration. With this process, a polymer solution with low content of salts can be obtained. However, the polymer has a relatively high viscosity, thus is difficult for the filtration operation. In addition, the filtration would be accompanied with loss of plenty of the polymer solution, and the production procedures of this process are complicated.

Chinese patent application No. CN101285214A discloses a process for preparing aramid 1313 fibers by wet spinning, comprising pre-polymerizing m-phenylenediamine (MPD) with isophthaloyl chloride (IPC) to give a prepolymer which is filtered and extruded through a twin screw extruder; completely neutralizing hydrogen chloride produced by the pre-polymerization using calcium hydroxide to obtain a spin dope; and wet spinning the spin dope to produce the finished fibers.

Another Chinese patent No. CN100455706C discloses a process for producing a spin dope of polyisophthaloyl metaphenylene diamine, comprising polymerizing m-phenylenediamine with isophthaloyl chloride in a polar organic amide solvent at a low temperature, and neutralizing hydrogen chloride produced by the polymerization using alkaline earth metal compounds to give alkaline earth metal chlorides which are soluble in the reaction system.

The current technologies including the approaches and processes discussed above have a common feature that the side product as a result of the neutralization reaction, hydrogen chloride, is required to be removed completely through a complete neutralization reaction. This can avoid the degradation of the spin dope containing hydrochloric acid before it is fed to the spinning station, but a great number of salts produced by the neutralization reaction would be included in the spin dope. It is well known in the art that the inclusion of the salts may make a strong impact on the properties of the finished fibers, for instance with a result of poor electrical insulation and increased grayscale of the fibers. As a consequence, washing thoroughly the fibers is needed in order to remove the salts. However, repeated washing of the fibers not only consumes a vast amount of water and wastes valuable resources, but also prolongs the production process, and more importantly, removing the salts by washing the fibers is not very effective.

The invention is developed to tackle the above technical problem by providing a method for preparing meta-aramid fibers which is effective to shorten the production time and reduce significantly the production costs. According to the method of the invention, the spin dope contains a little amount of salts which can be completely removed easily by the washing operations. Thus, both the costs of raw materials and the energy consumption necessary for preparing the fibers are reduced.

SUMMARY

An object of the invention is to provide a method for preparing meta-aramid fibers which is effective to shorten the production time, enhance the production efficiency and reduce the production costs.

This object and advantages of the invention are satisfied by providing a method for preparing meta-aramid fibers using m-phenylenediamine and isophthaloyl chloride as raw materials through polymerization, neutralization and spinning. The method comprises the operations of:
  i) polymerizing m-phenylenediamine with isophthaloyl chloride in a polar organic amide solvent at a low temperature to give a solution of polymer polyisophthaloyl metaphenylene diamine and hydrogen chloride;
  ii) neutralizing hydrogen chloride given in operation i) with a neutralizing agent in a twin-screw extruder to give a spin dope of polyisophthaloyl metaphenylene diamine;
  iii) extruding the spin dope obtained in operation ii) through the twin-screw extruder, spinning the extruded spin dope through a spinneret into a precipitation bath to precipitate spun filaments which are meta-aramid primary fibers; and iv) washing the meta-aramid primary fibers obtained in operation iii) at least once, drying and drawing the fibers to obtain the finished meta-aramid fibers, wherein in operation ii), the neutralizing agent is added in an amount that is sufficient only for neutralizing a part of hydrogen chloride, so that the resultant spin dope of polyisophthaloyl metaphenylene diamine contains salts produced by the neutralization reaction and a part of unneutralized hydrogen chloride.

In one preferred embodiment of the invention, the polar organic amide solvent is selected from N,N-dimethyl acetamide or N-methyl pyrrolidinone, and the neutralizing agent is selected from calcium hydroxide or calcium oxide. Preferably, in operation ii), calcium hydroxide or calcium oxide is added at 5% to 50%, more preferably 25% to 35%, of an equal molar ratio of the neutralization reaction.

In operation ii), the addition amount of the neutralizing agent can be adjusted or vary along with a flow rate of the solution of polymer polyisophthaloyl metaphenylene diamine, in order to ensure the addition of the neutralizing agent at a predetermined proportion.

According to the invention, the twin screw extruder may be directly followed by and connected to a metering pump through which the spin dope containing the unneutralized hydrogen chloride and the salts produced by the neutralization reaction is dosed and then fed into the spinneret to be extruded into the precipitation bath.

In operation ii), the spin dope obtained after the neutralization reaction contains by weight polyisophthaloyl metaphenylene diamine ranging from 16.56% to 19.37%, hydrogen chloride 2.54% to 5.81%, calcium chloride 0.39% to 4.52%, water 0.13% to 1.47%, the remaining being N,N-dimethyl acetamide or N-methyl pyrrolidinone.

The spin dope obtained in operation ii) has a temperature in a range of 20° C. to 80° C., preferably in the range of 40° C. to 50° C. In one embodiment of the invention, the twin screw extruder is of two-stage jacket configuration, wherein water at room temperature (for example at 20° C. to 25° C.) is introduced into a front stage of the jacket for exchanging with heat generated by the neutralization reaction for the cooling purpose, and constant temperature water is introduced into a rear stage of the jacket to ensure the temperature of the spin dope in the above range, i.e. 20° C. to 80° C., preferably 40° C. to 50° C. Generally, the temperature of the constant temperature water may correspond to the temperature of the spin dope, for example, the constant temperature water may have a temperature ranging from 30° C. to 80° C., preferably from 40° C. to 50° C.

According to the invention, the precipitation bath contains by weight N,N-dimethyl acetamide 30% to 70%, calcium chloride 10% to 20%, and the remaining being water, and the precipitation bath has a temperature in a range of 0° C. to 10° C.

Because only a part of hydrogen chloride produced by the polymerization is neutralized, the spin dope contains a little amount of salts, and instead contains relatively more hydrochloric acid. Hydrochloric acid is known to be removed readily, and the little amount of salts can be removed simply by the washing operations. Therefore, the costs of raw materials and a vast amount of water for washing the fibers to remove the salts can be reduced greatly, and the reduced gray scale of the finished fibers is ensured too. According to the invention, the spinning station is arranged in the vicinity of the twin screw extruder which is directly followed by and connected to the metering pump, such that the spin dope obtained by the neutralization in the twin screw extruder is transported to the spinning station immediately after it is dosed by the metering pump, whereby avoiding the degradation of the spin dope due to the presence of hydrochloric acid. In addition, direct connection of the metering pump to the twin screw extruder ensures the short production line. In practice, it has been found that the spin dope of the invention, which contains much more hydrochloric acid, do not have an adverse influence on the properties of the finished fibers.

To have a better understanding of the advantages and the technical effects of the invention reference is made to the following detailed description of the invention and embodiments thereof.

DETAILED DESCRIPTION

For an illustrative purpose, the invention is described in preferred embodiments in which m-phenylenediamine (MPD) and isophthaloyl chloride (IPC) are used as raw materials for the preparation of polyisophthaloyl metaphenylene diamine fibers by a wet spinning process. Generally, the method of the invention comprises the operations of polymerization, neutralization and spinning.

In the polymerization operation, MPD is reacted with IPC in a polar organic amide solvent at a low temperature to give a polymer polyisophthaloyl metaphenylene diamine and a side product hydrogen chloride.

The neutralization takes place in a twin screw extruder. The solution of the polymer polyisophthaloyl metaphenylene diamine and the side product hydrogen chloride is exactly dosed and transported into the twin screw extruder. A neutralizing agent is exactly dosed in accordance with a predetermined ratio and introduced into the twin screw extruder where a part of hydrogen chloride is neutralized with the neutralizing agent to give a spin dope containing the unneutralized hydrogen chloride and the salts produced by the neutralization.

In the spinning operation, the spin dope obtained in the neutralization operation is extruded through the twin screw extruder to a metering pump, and then extruded through a spinneret disposed in the vicinity of the twin screw extruder into spun filaments. The spun filaments are transported into a precipitation bath to give meta-aramid primary fibers. The primary fibers are washed for two times, dried and drawn to obtain the finished fibers.

The invention is wherein only a part of hydrogen chloride produced by the polymerization of MPD with IPC is neutralized with the neutralizing agent. For example, the neutralizing agent is added at 5% to 50%, preferably 25% to 35%, of an equal molar ratio of the neutralization reaction. Because the amount of the neutralizing agent is not sufficient for the complete neutralization, so the spin dope of polyisophthaloyl metaphenylene diamine contains the neutralization formation salts and a part of unneutralized hydrogen chloride. As can be seen, the amount of the neutralizing agent is decreased by about 50% to 95% of the equal molar ratio, which significantly reduces the costs of raw materials.

According to the invention, N,N-dimethyl acetamide or N-methyl pyrrolidinone may be used as the polar organic solvent.

Generally, the neutralizing agent is base compounds, such as calcium hydroxide ($Ca(OH)_2$), to give the salt calcium chloride ($CaCl_2$). Calcium chloride may serve as the cosolvent to provide a homogeneous and clear solution of polyisophthaloyl metaphenylene diamine.

It is necessary to exactly dose the amount of the solution of polyisophthaloyl metaphenylene diamine produced by the polymerization and the amount of calcium hydroxide to be added. The addition amount of calcium hydroxide is adjusted along with the flow rate of the solution of polymer polyisophthaloyl metaphenylene diamine, in order to ensure the addition of the calcium hydroxide into the solution at a predetermined proportion. This can ensures that the spin dope of polyisophthaloyl metaphenylene diamine contains its components at a predetermined ratio.

The spin dope of polyisophthaloyl metaphenylene diamine obtained after the neutralization contains by weight polyisophthaloyl metaphenylene diamine ranging from 16.56% to 19.37%, hydrogen chloride 2.54% to 5.81%, calcium chloride 0.39% to 4.52%, water 0.13% to 1.47%, the remaining being N,N-dimethyl acetamide.

As described above, the neutralization is performed in the twin screw extruder which is directly followed by the metering pump. The spin dope containing the unneutralized hydrogen chloride and the neutralization formation salts is spun directly. Due to the elimination of a neutralization reactor as well as pumps and pipes in association therewith, the above arrangement can effectively shorten the production line, save the equipment costs during the production of the fibers, and reduce the energy consumption for transporting the materials.

According to the invention, the twin screw extruder is of two-stage jacket configuration so that a suitable medium can be introduced according the actual needs so as to ensure the temperature required for the production of the aramid fibers. In the method of the invention, the neutralization takes place in the front part of the twin screw extruder to generate a mass of heat energies. So water at room temperature is usually introduced into a front stage of the jacket for exchanging with the heat energies. While constant temperature water for example at 40° C. to 50° C. is usually introduced into a rear stage of the jacket to ensure the spinning temperature of the spin dope in the range of 20° C. to 80° C., preferably 40° C. to 50° C.

The precipitation bath contains a mixture of water, N,N-dimethyl acetamide and calcium chloride. Generally, the precipitation baths contains by weight N,N-dimethyl acetamide 30% to 70%, calcium chloride 10% to 20%, and the remaining being water. The temperature of the precipitation bath is in a range of 0° C. to 10° C.

The primary fibers are precipitated slowly in the precipitation bath to form a homogeneous and less dense fibrous structure, because the temperature of the precipitation bath is relatively low. Such a fibrous structure allows permeation of hydrochloric acid within the fibers into the precipitation bath, which enables the removal of a large part of hydrochloric acid. The primary fibers coming out of the precipitation bath are washed twice, which can basically eliminate the remaining hydrochloric acid and the salts produced by the neutralization. Hydrogen chloride has a great water-solubility and the fibers contain a little amount of salts, therefore the acid and the salts can be easily eliminated by the washing operations. This enables the saving of a vast amount of water for washing the fibers. Since the acid and the salts occur in only minute amounts, the finished fibers have a very low gray scale and excellent electrical insulation properties.

After the washing operations, the meta-aramid primary fibers are subject to drying, dry-heat drawing and crimping to give the finished fibers.

Example 1

At –20° C., 1 part by weight of MPD was dissolved in 9.1 parts by weight of N,N-dimethyl acetamide under stirring in a polymerization reactor. To the stirring solution was added 1.88 parts by weight of IPC, the reaction mixture was stirred for 30 minutes to afford a polymer solution containing hydrogen chloride. The polymer solution was mixed with 0.21 part by weight of calcium hydroxide, and the mixture was fed into the twin screw extruder where the partial neutralization reaction took place. Since the added calcium hydroxide accounted for a small portion of the equal molar ratio of the neutralization reaction, all the added calcium hydroxide was reacted with a part of hydrogen chloride, and the remaining hydrogen remained unneutralized. Therefore, the resultant spin dope contains polyisophthaloyl metaphenylene diamine 18.08%, hydrogen chloride 3.88%, calcium chloride 2.53%, water 0.82%, and N,N-dimethyl acetamide 74.69%. The spin dope was kept at 40° C., and dosed by the metering pump and then immediately transported to the spinneret and the precipitation bath arranged in the vicinity of the twin screw extruder. The precipitation bath was kept at 8° C. and contains N,N-dimethyl acetamide 45%, calcium chloride 15%, and water 40%. The primary fibers from the precipitation bath was drawn in boiling water, washed twice, dried, dry-heat drawn and crimped to afford the finished meta-aramid fibers. It was tested that the finished meta-aramid fibers has a denier of 2.0 dtex, a tensile strength of 4.5 CN/dtex, and a gray scale of 983 ppm.

Example 2

At –20° C., 1 part by weight of MPD was dissolved in 9.1 parts by weight of N,N-dimethyl acetamide under stirring in a polymerization reactor. To the stirring solution was added 1.88 parts by weight of IPC, the reaction mixture was stirred for 30 minutes to afford a polymer solution containing hydrogen chloride. The polymer solution was mixed with 0.27 part by weight of calcium hydroxide, and the mixture was fed into the twin screw extruder where the partial neutralization reaction took place. The resultant spin dope after the neutralization reaction contains polyisophthaloyl metaphenylene diamine 17.98%, hydrogen chloride 3.31%, calcium chloride 3.35%, water 1.09%, and N,N-dimethyl acetamide 74.27%. The spin dope was kept at 40° C., and dosed by the metering pump and then immediately transported to the spinneret and the precipitation bath arranged in the vicinity of the twin screw extruder. The precipitation bath was kept at 8° C. and contains N,N-dimethyl acetamide 45%, calcium chloride 15%, and water 40%. The primary fibers from the precipitation bath was drawn in boiling water, washed twice, dried, dry-heat drawn and crimped to afford the finished meta-aramid fibers. It was tested that the finished meta-aramid fibers has a denier of 2.0 dtex, a tensile strength of 4.5 CN/dtex, and a gray scale of 1532 ppm.

Example 3

At –20° C., 1 part by weight of MPD was dissolved in 9.1 parts by weight of N,N-dimethyl acetamide under stirring in a polymerization reactor. To the stirring solution was added 1.88 parts by weight of IPC, the reaction mixture was stirred for 30 minutes to afford a polymer solution containing hydrogen chloride. The polymer solution was mixed with 0.04 part by weight of calcium hydroxide, and the mixture was fed into the twin screw extruder where the partial neutralization reaction took place. The resultant spin dope after the neutralization reaction contains polyisophthaloyl metaphenylene diamine 18.34%, hydrogen chloride 5.34%, calcium chloride 0.43%, water 0.14%, and N,N-dimethyl acetamide 75.75%. The spin dope was kept at 40° C., and dosed by the metering pump and then immediately transported to the spinneret and the precipitation bath arranged in the vicinity of the twin screw extruder. The precipitation bath was kept at 8° C. and contains N,N-dimethyl acetamide 45%, calcium chloride 15%, and water 40%. The primary fibers from the precipitation bath was drawn in boiling water, washed twice, dried, dry-heat drawn and crimped to afford the finished meta-aramid fibers. It was tested that the finished meta-aramid fibers has a denier of 2.1 dtex, a tensile strength of 3.7 CN/dtex, and a gray scale of 517 ppm.

Example 4

At −20° C., 1 part by weight of MPD was dissolved in 9.1 parts by weight of N,N-dimethyl acetamide under stirring in a polymerization reactor. To the stirring solution was added 1.88 parts by weight of IPC, the reaction mixture was stirred for 30 minutes to afford a polymer solution containing hydrogen chloride. The polymer solution was mixed with 0.34 part by weight of calcium hydroxide, and the mixture was fed into the twin screw extruder where the partial neutralization reaction took place. The resultant spin dope after the neutralization reaction contains polyisophthaloyl metaphenylene diamine 17.88%, hydrogen chloride 2.74%, calcium chloride 4.17%, water 1.35%, and N,N-dimethyl acetamide 73.86%. The spin dope was kept at 40° C., and dosed by the metering pump and then immediately transported to the spinneret and the precipitation bath arranged in the vicinity of the twin screw extruder. The precipitation bath was kept at 8° C. and contains N,N-dimethyl acetamide 45%, calcium chloride 15%, and water 40%. The primary fibers from the precipitation bath was drawn in boiling water, washed twice, dried, dry-heat drawn and crimped to afford the finished meta-aramid fibers. It was tested that the finished meta-aramid fibers has a denier of 2.0 dtex, a tensile strength of 4.3 CN/dtex, and a gray scale of 2039 ppm.

Comparative Example 1

In this comparative example, hydrogen chloride produced by the polymerization was completely neutralized in the neutralization operation. At −20° C., 1 part by weight of MPD was dissolved in 9.1 parts by weight of N,N-dimethyl acetamide under stirring in a polymerization reactor. To the stirring solution was added 1.88 parts by weight of IPC, the reaction mixture was stirred for 30 minutes to afford a polymer solution containing hydrogen chloride. The polymer solution was mixed with 0.68 part by weight of calcium hydroxide, and the mixture was fed into the twin screw extruder where the complete neutralization reaction took place. The resultant spin dope after the neutralization reaction contains polyisophthaloyl metaphenylene diamine 17.40%, hydrogen chloride 0.04%, calcium chloride 8.06%, water 2.61%, and N,N-dimethyl acetamide 71.89%. The spin dope was kept at 40° C., and dosed by the metering pump and then immediately transported to the spinneret and the precipitation bath arranged in the vicinity of the twin screw extruder. The precipitation bath was kept at 8° C. and contains N,N-dimethyl acetamide 45%, calcium chloride 15%, and water 40%. The primary fibers from the precipitation bath was drawn in boiling water, washed twice, dried, dry-heat drawn and crimped to afford the finished meta-aramid fibers. It was tested that the finished meta-aramid fibers has a denier of 2.1 dtex, a tensile strength of 4.2 CN/dtex, and a gray scale of 3621 ppm.

The above examples revealed that neutralizing a part of hydrogen chloride in the neutralization operation not only greatly decreases the amount of the neutralizing agent, which thus decreases the content of the salts contained in the spin dope and the finished aramid fibers, but also leads to reduced gray scale of the fibers (in particular the gray scale is below 1000 in Examples 1 and 3) to improve the electrical insulation properties of the fibers. The method of the invention has a short production line with reduced amount of the neutralizing agent, therefore both the costs of raw materials and the production energy consumption are saved.

While the embodiments described herein are intended as exemplary methods for preparing meta-aramid fibers, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. A method for preparing meta-aramid fibers, the method comprising:
   i) polymerizing m-phenylenediamine with isophthaloyl chloride in a polar organic amide solvent at a low temperature to give a solution of polymer polyisophthaloyl metaphenylene diamine and hydrogen chloride;
   ii) neutralizing hydrogen chloride given in operation i) with a neutralizing agent in a twin-screw extruder to give a spin dope of polyisophthaloyl metaphenylene diamine;
   iii) extruding the spin dope obtained in operation ii) through the twin-screw extruder, spinning the extruded spin dope through a spinneret into a precipitation bath to precipitate spun filaments which are meta-aramid primary fibers; and
   iv) washing the meta-aramid primary fibers obtained in operation iii) at least once, drying and drawing the fibers to obtain the finished meta-aramid fibers,
   wherein in operation ii) the neutralizing agent is added in an amount that is sufficient only for neutralizing a part of hydrogen chloride, so that the resultant spin dope of polyisophthaloyl metaphenylene diamine contains salts produced by the neutralization reaction and a part of unneutralized hydrogen chloride, and the neutralizing agent is added at 5% to 50% of an equal molar ratio of the neutralization reaction, and
   wherein the twin screw extruder is directly followed by and connected to a metering pump through which the spin dope containing the unneutralized hydrogen chloride and the salts produced by the neutralization reaction is dosed and then fed into the spinneret to be extruded into the precipitation bath, and that the twin screw extruder includes a two-stage jacket configuration, wherein water at room temperature is introduced into a front stage of the jacket for exchanging with heat generated by the neutralization reaction, and constant temperature water is introduced into a rear stage of the jacket to ensure the temperature of the spin dope.

2. A method as claimed in claim 1, wherein the polar organic amide solvent is selected from N,N-dimethyl acetamide or N-methyl pyrrolidinone, and the neutralizing agent is selected from calcium hydroxide or calcium oxide.

3. A method as claimed in claim 1, wherein the neutralizing agent is added at 25% to 35% of the equal molar ratio of the neutralization reaction.

4. A method as claimed in claim 1, wherein in operation ii), the addition amount of the neutralizing agent is adjusted along with a flow rate of the solution of polymer polyisophthaloyl metaphenylene diamine, in order to ensure the addition of the neutralizing agent at a predetermined proportion.

5. A method as claimed in claim 2, wherein in operation ii), the spin dope obtained after the neutralization reaction contains by weight polyisophthaloyl metaphenylene diamine ranging from 16.56% to 19.37%, hydrogen chloride 2.54% to 5.81%, calcium chloride 0.39% to 4.52%, water 0.13% to 1.47%, the remaining being N,N-dimethyl acetamide or N-methyl pyrrolidinone.

6. A method as claimed in claim 1, wherein the spin dope obtained in operation ii) has a temperature in a range of 20° C. to 80° C.

7. A method as claimed in claim 6, wherein the temperature of the spin dope is 40° C. to 50° C.

8. A method as claimed in claim 1, wherein the precipitation bath contains by weight N,N-dimethyl acetamide 30% to 70%, calcium chloride 10% to 20%, and the remaining being water, and that the precipitation bath has a temperature in a range of 0° C. to 10° C.

9. A method for preparing meta-aramid fibers, the method comprising:
  polymerizing m-phenylenediamine with isophthaloyl chloride in a polar organic amide solvent at a low temperature to produce a solution of polymer polyisophthaloyl metaphenylene diamine and hydrogen chloride;
  neutralizing the hydrogen chloride given with a neutralizing agent in a twin-screw extruder to give a spin dope of polyisophthaloyl metaphenylene diamine, wherein the neutralizing agent is added in an amount that is sufficient only for neutralizing a part of the hydrogen chloride, so that the resultant spin dope of polyisophthaloyl metaphenylene diamine includes salts produced by a neutralization reaction and hydrogen chloride in an un-neutralized state, and the neutralizing agent is added at 5% to 50% of an equal molar ratio of the neutralization reaction;
  extruding the spin dope;
  spinning the extruded spin dope through a spinneret into a precipitation bath to precipitate spun filaments which are meta-aramid primary fibers;
  washing the meta-aramid primary fibers at least once; and
  drying and drawing the fibers to obtain the finished meta-aramid fibers,
  wherein the twin screw extruder is directly followed by and connected to a metering pump through which the spin dope containing the unneutralized hydrogen chloride and the salts produced by the neutralization reaction is dosed and then fed into the spinneret to be extruded into the precipitation bath, and that the twin screw extruder includes a two-stage jacket configuration, wherein water at room temperature is introduced into a front stage of the jacket for exchanging with heat generated by the neutralization reaction, and constant temperature water is introduced into a rear stage of the jacket to ensure the temperature of the spin dope.

* * * * *